UNITED STATES PATENT OFFICE.

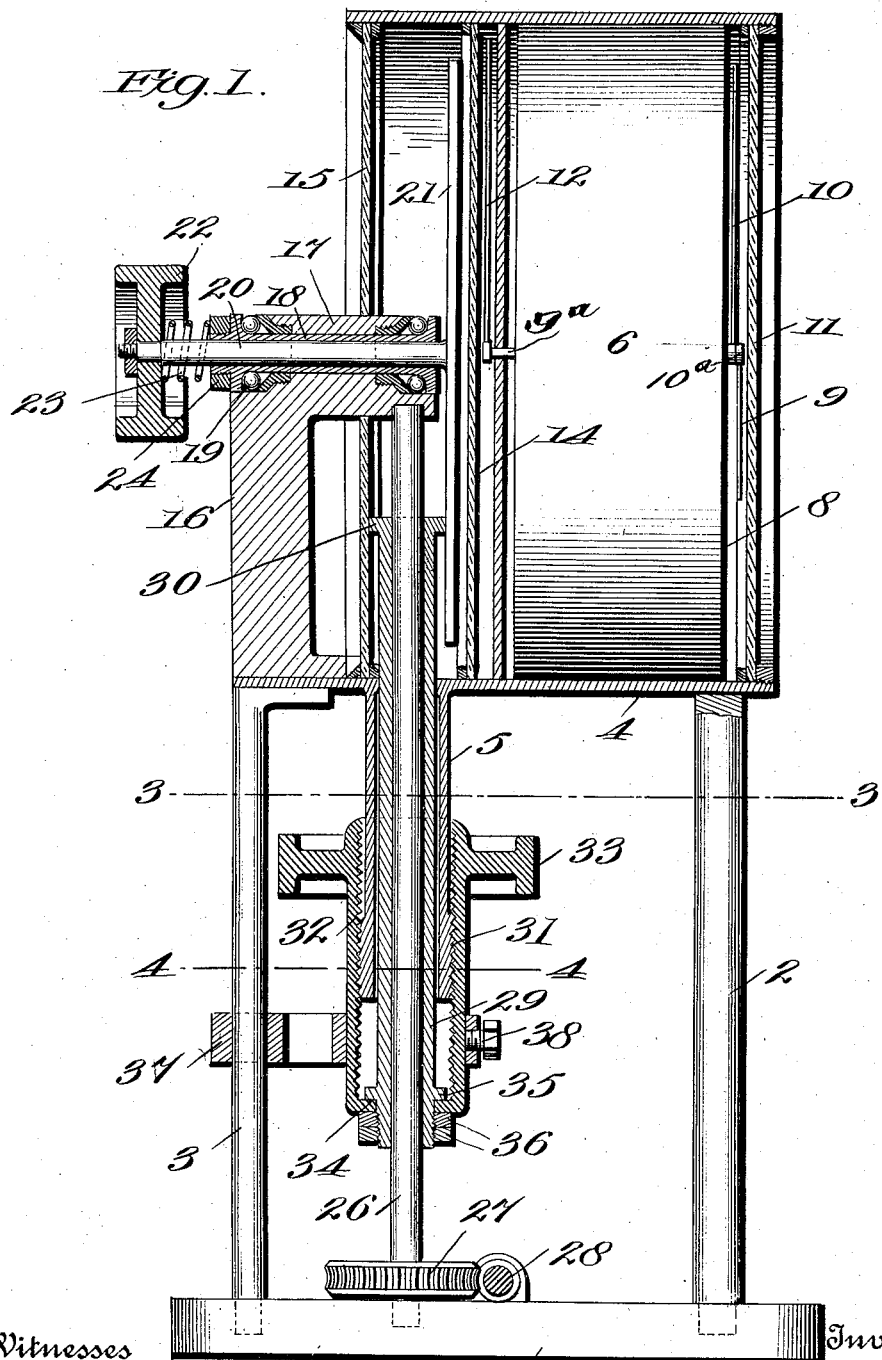

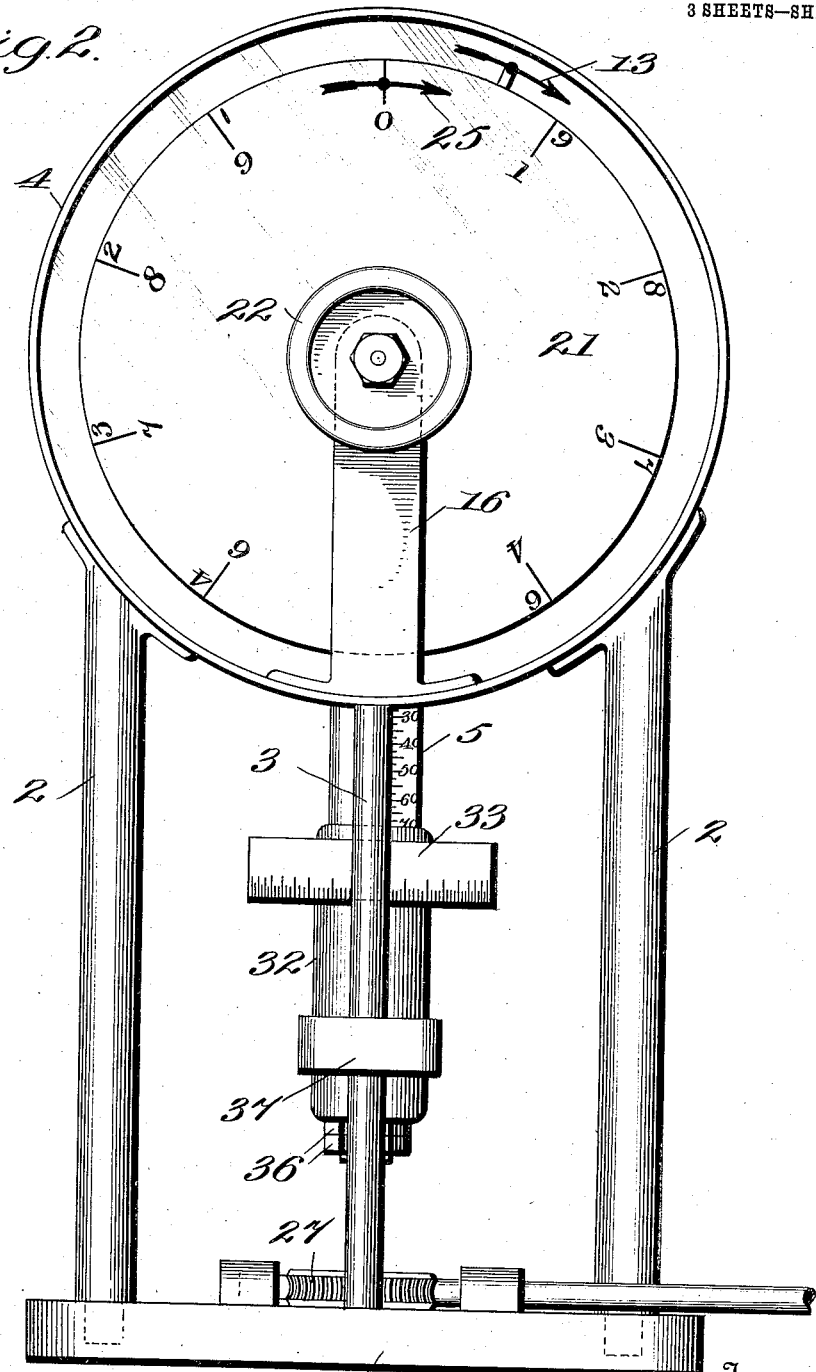

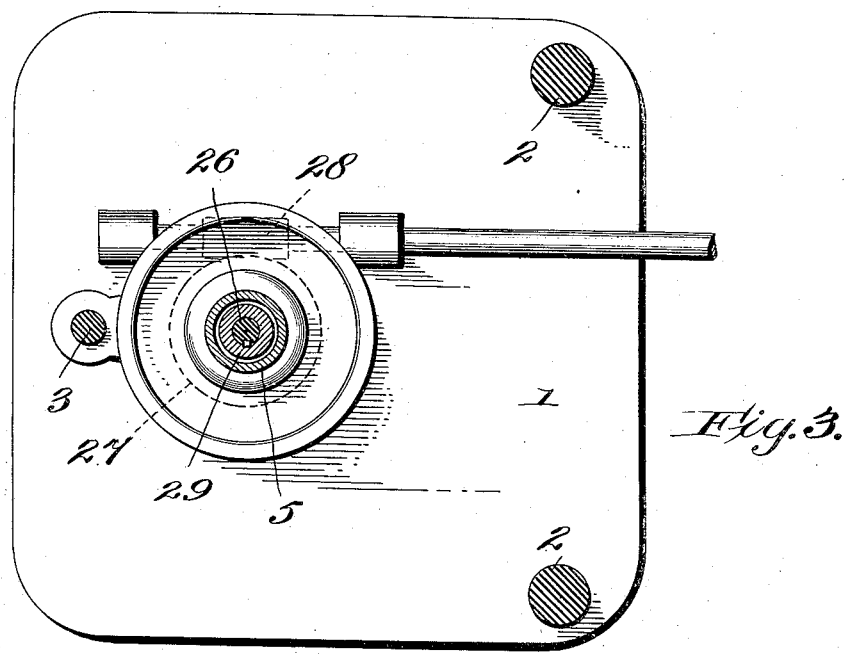
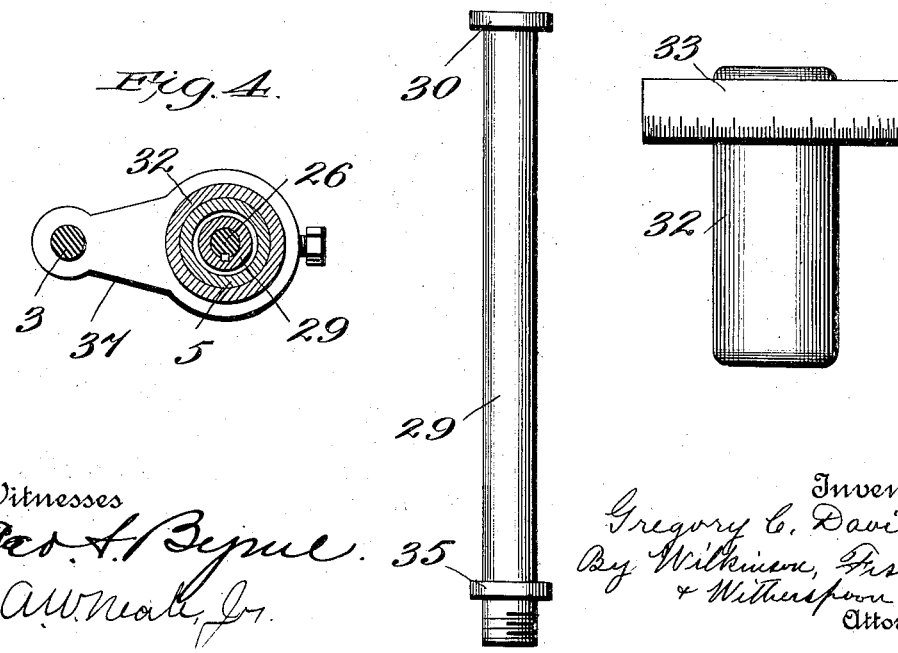

GREGORY CALDWELL DAVISON, OF HINGHAM, MASSACHUSETTS.

SPEED-REGULATOR.

951,725.

Specification of Letters Patent. Patented Mar. 8, 1910.

Application filed May 22, 1909. Serial No. 497,748.

*To all whom it may concern:*

Be it known that I, GREGORY CALDWELL DAVISON, a citizen of the United States, residing at Hingham, in the county of Plymouth and State of Massachusetts, have invented certain new and useful Improvements in Speed-Regulators; and I do hereby declare the following to be a full, clear, and exact description of the invention, such as will enable others skilled in the art to which it appertains to make and use the same.

My invention relates to improvements in speed regulators. It belongs to the general class of speed measuring instruments, which involve a comparison of the speed to be measured with that of the uniform speed indicated by a clock mechanism. Such device is shown in my former patent, No. 669,457, dated March 5, 1901. The present device, although it belongs to the same general class, is of entirely different construction, and is designed for a specific purpose.

The object of this invention is to furnish means for running an engine or other mechanism at any constant predetermined speed, means for adjusting the mechanism to suit any predetermined speed, and means for correcting any excess or deficiency of revolutions of the engine or other mechanism, which may be found to exist.

This invention is primarily intended for use on the vessels of a squadron or fleet, where it is essential that the leading or guide ship should run at an absolutely constant speed, and that the other vessels should run at exactly the same speed, keeping a fixed interval between the vessels, although it is not restricted to this use. With the methods ordinarily used, it has been impossible to realize these ideal conditions, and in practice, they are realized only approximately by continuously changing the speeds of the ships in an effort to keep them in their proper relative positions. By my invention, however, this can be readily and easily obtained.

With these objects in view, my invention consists in the construction and combinations of parts as hereinafter described and claimed.

In the accompanying drawings—Figure 1 is a vertical section of my invention. Fig. 2 is a front view thereof. Fig. 3 is a cross section on the line 3—3 of Fig. 1. Fig. 4 is a section on the line 4—4 of Fig. 1. Fig. 5 is a perspective view of the friction sleeve, and Fig. 6 is a perspective view of the micrometer and sleeve.

1 represents the base plate, to which are connected pillars or supports 2 and 3. On the tops of these supports is mounted a cylindrical casing 4, provided with a downwardly-extending tubular portion 5. In the casing 4 is mounted a clockwork mechanism 6, of any ordinary or preferred type. 8 represents the face of said clock mechanism, sub-divided in the usual way, and provided with hour and minute hands 9 and 10, which hands are mounted on a shaft 9ª having a projection 10ª, whereby the clock mechanism may be wound up. 11 represents a protective glass casing, such as is ordinarily used for clocks or chronometers. The opposite face of the clock mechanism is provided with a seconds hand 12, having on its outer end an indicating arrow 13, which is arranged to rotate behind the glass disk 14, making one complete revolution every minute.

15 represents a protective glass plate or casing.

Extending upwardly from the lower part of the cylinder 4 is a pillar 16, having an extension 17, which extends inwardly through a perforation in the center of the plate 15. This extension is perforated, and through it passes a sleeve 18, arranged to revolve freely therein, ball bearings 19 being provided at either end to reduce the friction to a minimum. In this sleeve is mounted a shaft 20, which carries on its inner end a friction disk 21. To one end of the shaft 20 is attached an adjusting wheel 22, and a spring 23 is provided, which rests against an adjusting nut 24 on the end of the sleeve 18, and which normally tends to throw the friction disk 21 to the left, as shown in Fig. 1. The face of the friction disk 21 is divided into a number of equal divisions, preferably ten, consecutively numbered, the starting point having an indicating arrow 25, for a purpose hereinafter described.

In suitable bearings in the extension 17 and base plate 1 is freely mounted a shaft 26, having a worm wheel 27 fixed thereto near its lower end. This worm wheel engages with a worm 28, which is directly connected to the engine. Splined to the shaft 26, so that it will rotate therewith, but freely movable longitudinally thereon, is a sleeve 29, which carries on its upper end a friction disk 30, adapted to engage the friction disk 21, the spring 23 always tending to keep said disks in engagement. This sleeve 29 may be adjusted up and down on the shaft 26 by the following means: The lower end of the extension 5 is screw-threaded, as shown at 31. Engaging this screw-threaded portion is an internally screw-threaded sleeve 32, carrying a micrometer wheel 33. The lower part of this sleeve has an extension 34, which engages a collar 35 on the sleeve 29, so that a movement of the micrometer wheel 33 will cause an up or down movement of the sleeve 32 and a corresponding movement of the sleeve 29. The lower end of the sleeve 29 is screw-threaded, and adjustable set nuts 36 are screwed thereon to keep the parts in proper relative positions, and to compensate for wear. After a desired adjustment has been obtained, it is maintained in the following way:

Attached to the pillar or post 3 is a bracket 37, having a perforation through which passes the sleeve 32, and 38 represents a set screw, whereby said sleeve 32 may be firmly fastened in any desired position in the bracket.

The operation is as follows: The hand 12 makes one revolution per minute, being actuated by the clock mechanism. It is unincumbered by any mechanical connections, and will therefore revolve with the same precision and uniformity as the seconds hand of a chronometer. This uniformity is practically such that the variation of speed is less than one one-thousandth of one per cent. The friction disk 21 is geared to the engine by the connections already described, and revolves at a speed proportionate to that of the engine. As already described, the position of the friction disk 21, by means of the hand wheel 22, may be adjusted as desired to any position relatively to that of the seconds hand 12. For a predetermined speed of the engine, there will be some position of the friction disk 30 which will cause the disk 21 to revolve exactly once a minute. If at the beginning the arrows 13 and 25 are brought in line, and if they keep together during the movement of the mechanism, then the engine is running practically with absolute uniformity. If it is desired that the engine run at a slower but still at a uniform rate, the disk 30 is set at a position nearer the center of the disk 21. This change alters the running ratio in the disks, so that in order to keep the arrows 25 and 13 revolving uniformly, the speed of the disk 30, and therefore that of the engine, must be decreased.

In order that a very fine adjustment of speed may be made, the micrometer arrangement already described is used. The fixed tube 5 is graduated with horizontal lines corresponding to the pitch of the screw-head. The micrometer head 33 is graduated around its circumference for revolutions and fractions thereof. This will enable very fine adjustments to be made, such as one one-hundredth of a revolution for an engine whose normal speed is one hundred revolutions per minute. With this fine adjustment, arrangements are also made for taking up all lost motion due to wear, by the nuts 36 on the micrometer and the nut 24.

In order to keep the friction disks in contact, the shaft 20 is mounted in a spool or sleeve 18, which revolves with it, but allows the shaft to be moved longitudinally therein, the spring 23 being provided to normally keep the friction disks in contact.

A further valuable use of this instrument in connection with a fleet of war vessels, is that if a ship should be out of its position, it may be brought back into the required position and distance by a single operation. The face of the disk 21 is marked with a number of equal divisions, preferably ten, numbered in both directions. For example, if the screw of a ship is making one hundred revolutions per minute, and the ship finds herself, say thirty yards behind her position, and it is known that thirty yards corresponds to ten revolutions of the propeller screw, then by pushing in the wheel 22, and turning the disk 21 to the left, so that its zero position is one-tenth of a minute (that is, ten revolutions of the engine) behind the center of the arrow 13, then the position of the arrows will correspond to the relative character and actual position of the ship. If now the speed of the engine be temporarily increased, the two arrows will gradually approach each other, coming into coincidence at the time when the ship is in her proper position, after which the normal speed will be maintained to keep these arrows always in coincidence.

I claim:—

1. In a speed indicator and regulator, the combination of a standard indicator, means for revolving it at a uniform rate of speed, an observation indicator arranged in proximity thereto, means for adjusting said observation indicator relatively to the standard indicator, connections between the observation indicator and the engine whose speed is to be regulated, and means for adjusting said connections, including a sleeve provided with a friction disk adapted to engage with the observation indicator, and means for adjusting said sleeve toward and away from the center of said observation indicator, substantially as described.

2. In a speed indicator and regulator, the combination of a standard indicator, mechanism for revolving it at a uniform rate of speed, an observation indicator arranged in proximity thereto, means for adjusting the position of said observation indicator relatively to that of the standard indicator, connections between said observation indicator and the engine whose speed is to be observed, and means for adjusting said connections, including a sleeve provided with a friction disk adapted to engage the observation indicator, and means for adjusting said sleeve, including a suitable support and a micrometer wheel adjustably mounted on said support, and engaging said sleeve, substantially as described.

3. In a speed indicator and regulator, the combination of a standard indicator, means for revolving it at a uniform rate of speed, an observation indicator arranged in proximity thereto consisting of a flat disk having its surface subdivided and marked, a shaft connected to the center of said disk, a sleeve in which said shaft is mounted, a hand wheel fixed to one end of said shaft, a spring between said hand wheel and said sleeve, and connections whereby said disk is driven by the engine whose speed is to be observed and regulated, substantially as described.

4. In a speed indicator and regulator, the combination of an indicating hand, clockwork mechanism for moving said hand at a uniform rate of speed, an observation indicator consisting of a flat disk having its face subdivided and marked, means for adjusting the position of said disk relatively to said hand, and connections between said disk and the engine whose speed is to be observed and regulated, including a shaft driven by the engine, a sleeve splined to said shaft and having at one end a friction disk adapted to engage with said indicating disk, a micrometer provided with a sleeve engaging said first-named sleeve, and means for locking the sleeve of the micrometer after it has been adjusted, substantially as described.

5. In a speed indicator and regulator, the combination of a hand adapted to revolve once a minute, clockwork mechanism for revolving said hand, an indicator disk arranged in proximity to said hand and adjustable relatively thereto, said indicator disk having its face sub-divided and marked, and means for driving said disk by the engine whose speed is to be observed and regulated, including a shaft driven by said engine, a sleeve splined to said shaft and slidably mounted thereon, said sleeve being provided with a friction disk at one end engaging said indicator disk, a graduated support, a micrometer wheel movably mounted on said support and having a part engaging said sleeve, and means for locking said micrometer wheel when adjusted, substantially as described.

In testimony whereof, I affix my signature, in presence of two witnesses.

GREGORY CALDWELL DAVISON.

Witnesses:
W. D. FESLER,
F. L. BRAKE.